(12) United States Patent
Pilzweger

(10) Patent No.: US 10,267,413 B2
(45) Date of Patent: Apr. 23, 2019

(54) METHOD FOR OPERATING AN AUTOMATIC TRANSMISSION CONTROL

(71) Applicant: ZF Friedrichshafen AG, Friedrichshafen (DE)

(72) Inventor: Hans Pilzweger, Neuhaus am Inn (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 15/806,617

(22) Filed: Nov. 8, 2017

(65) Prior Publication Data

US 2018/0149264 A1     May 31, 2018

(30) Foreign Application Priority Data

Nov. 28, 2016   (DE) .................. 10 2016 223 569

(51) Int. Cl.
*F16H 61/02*   (2006.01)
*F16H 59/36*   (2006.01)
*F16H 59/48*   (2006.01)

(52) U.S. Cl.
CPC ......... *F16H 61/0213* (2013.01); *F16H 59/36* (2013.01); *F16H 59/48* (2013.01); *F16H 2059/366* (2013.01); *F16H 2061/0216* (2013.01)

(58) Field of Classification Search
CPC ......... F16H 61/0213; F16H 2061/0216; F16H 2059/366; F16H 59/36; F16H 59/48
See application file for complete search history.

(56) References Cited

U.S. PATENT DOCUMENTS

| | | | |
|---|---|---|---|
| 5,806,370 A | * | 9/1998 | Carlson ............... F16H 61/0213 477/78 |
| 2016/0348785 A1 | * | 12/2016 | Patenaude ........... F16H 61/0213 |
| 2017/0174219 A1 | * | 6/2017 | Omran ................. B60K 31/042 |
| 2017/0198808 A1 | * | 7/2017 | Bulgrien ........... B60W 30/1882 |

* cited by examiner

*Primary Examiner* — David J Hlavka
(74) *Attorney, Agent, or Firm* — Davis & Bujold PLLC; Michael J. Bujold

(57) ABSTRACT

A method of operating an automated transmission control for a powershift transmission having a plurality of powershift gears and a synchronized transmission having a plurality of synchronized gears in the drive-train of a vehicle. The drive-train includes a drive motor, the powershift transmission and the synchronized transmission, with an electronic control unit by which an upshift of the gears of the synchronized transmission and the upshift of the gears of the powershift transmission can be carried out, and to which a motor load signal representing the motor load of the drive motor and a rotational speed signal representing the rotational speed at the output of the drive motor can be sent.

9 Claims, 2 Drawing Sheets

METHOD FOR OPERATING AN AUTOMATIC TRANSMISSION CONTROL

This application claims priority from German patent application serial no. 10 2016 223 569.9 filed Nov. 29, 2016.

FIELD OF THE INVENTION

The invention relates to a method for operating an automated transmission control for a powershift transmission comprising a plurality of powershiftable gears and a synchronized transmission comprising a plurality of synchronized gears in a drive-train of a vehicle, such that the drive-train comprises a drive motor, the powershift transmission and the synchronized transmission, with an electronic control unit by means of which an upshift of the gears of the synchronized transmission and of the gears of the powershift transmission can be carried out and to which a motor bad signal representing the motor load of the drive motor and a rotational speed signal representing the rotational speed of the output of the drive motor can be supplied.

BACKGROUND OF THE INVENTION

In a method for operating an automated transmission control, it is known first to shift each powershift gear in an engaged synchronized gear, before the synchronized gear can be changed. The result of this is that many powershift gears have to be engaged and the vehicle accelerates relatively slowly, with poor efficiency.

SUMMARY OF THE INVENTION

Thus, the purpose of the present invention is to provide a method for operating an automated transmission control of the type mentioned, which at least substantially reduces these disadvantages, improves efficiency and enables the vehicle to accelerate more rapidly.

According to the invention, these objectives are achieved in that the synchronized transmission:
  if a predetermined rotational speed rise/rotational speed gradient of the rotational speed of the output of the drive motor is exceeded, or
  if a predetermined rotational speed of the output of the drive motor is exceeded and a motor load increases above a predetermined motor load which is lower than the full motor load,
  can be upshifted by one or more synchronized gears,
and the powershift transmission:
  below a predetermined rotational speed rise/rotational speed gradient of the rotational speed of the output of the drive motor, or
  below a predetermined rotational speed of the output of the drive motor and a motor load below a predetermined motor load, and if a predeterminable rotational speed threshold of the rotational speed of the output of the drive motor is reached, can be upshifted by one or more powershift gears.

By virtue of this method, it is decided on the basis of the motor load whether a gear of the synchronized transmission or whether all the gears of the powershift transmission have to be shifted. In that way, depending on the motor load the gears of the synchronized transmission can be engaged directly, whereby the vehicle can accelerate more rapidly and not all of the gears of the powershift transmission have to be shifted.

In the automatic mode of the vehicle, the electronic control unit checks the motor load of the drive motor, the rotational speed at the output of the drive motor and the gradient of the rotational speed of the drive motor before an automated shift, and decides whether a gear of the synchronized transmission or whether all the gears of the powershift transmission should be shifted. If the motor load is high, then for the next automated shift, a gear of the powershift transmission is shifted, since a gearshift of the synchronized transmission would result in too high a load on the drive motor. If the motor load is low, a gearshift is carried out in the synchronized transmission since the drive motor is not yet loaded to its limit and still has reserves in the next gear of the synchronized transmission.

The predetermined rotational speed at the output of the drive motor is preferably higher than 1900 r/min and particularly in the range above 2050 r/min.

The predetermined motor load is preferably higher than 65% of the full load, in particular in the range of 75% of the full load.

The predeterminable rotational speed threshold of the rotational speed of the output of the drive motor can be more than 1300 r/min and is preferably between 1400 r/min and 2100 r/min.

To vary the rotational speed threshold the predeterminable rotational speed threshold can be manually input to the control unit, for which purpose, in particular the predeterminable rotational speed threshold can be input into the control unit by way of an input unit.

It is understood that these values depend on the type of drive motor and can differ from the values mentioned.

BRIEF DESCRIPTION OF THE DRAWINGS

An example embodiment of the invention is illustrated in the drawings and will be described in greater detail below. The drawings show.

DETAILED DESCRIPTION OF THE PREFERRED EMBODIMENTS

Figure 1:
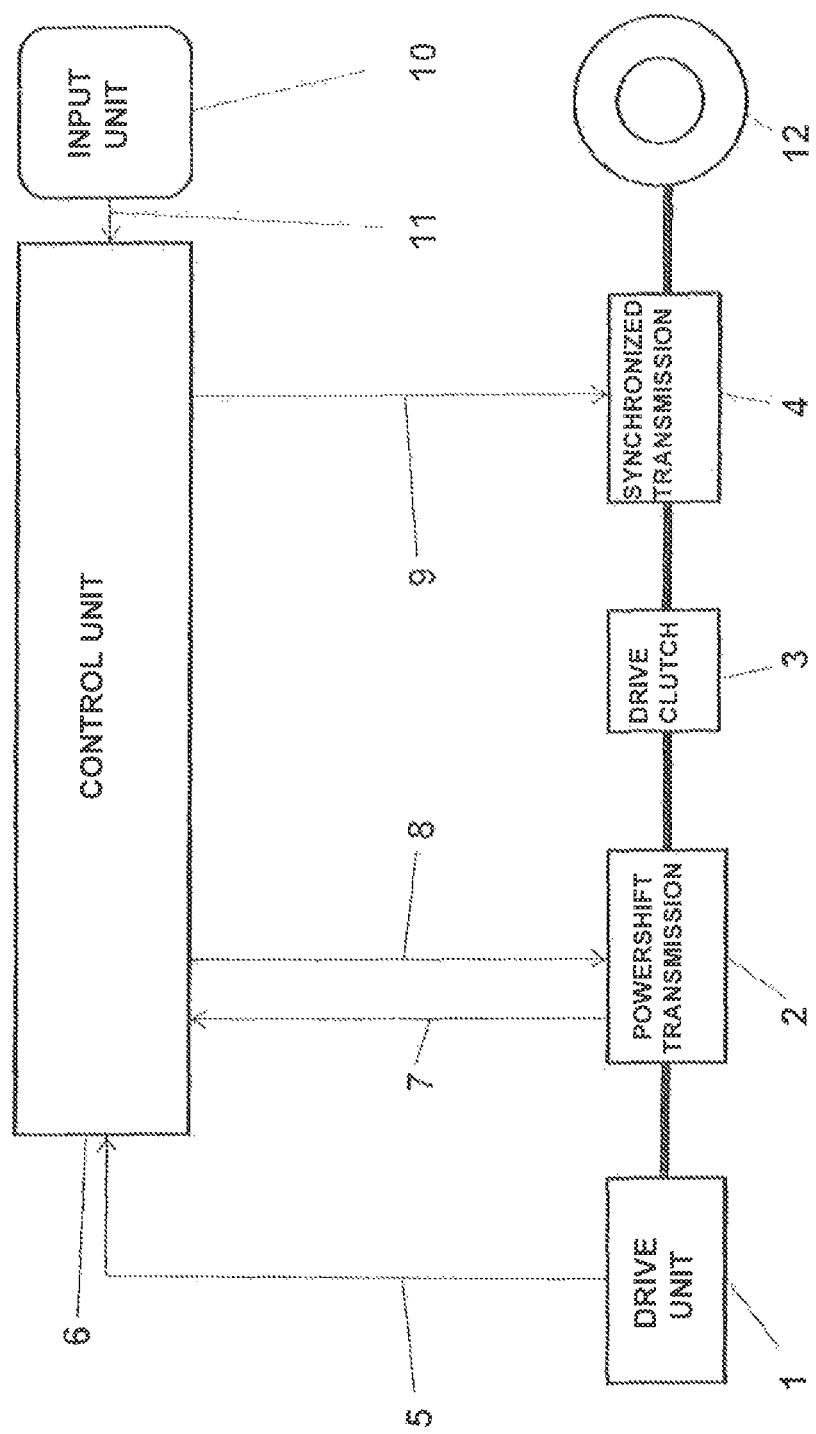
FIG. 1: A block diagram of an automated transmission control for a powershift transmission having a plurality of powershift gears and a synchronized transmission having a plurality of synchronized gears, in the drive-train of a vehicle

The automated transmission control illustrated in FIG. 1 comprises a drive motor 1 of a vehicle, by means of which a powershift transmission 2 can be driven in rotation. By way of a driving clutch 3, the powershift transmission 2 drives a synchronized transmission 4, which in turn rotationally drives the rear axle 12 of the vehicle.

The powershift transmission 2 has gears 1, 2, 3, 4, 5 and 6. The synchronized transmission 4 has gears A, B, C, D and E.

By way of a first signal line 5, a motor load signal representing the motor load of the drive motor 1 is sent to an electronic control, unit 6.

By way of a second signal line 7, the control unit 6 receives rotational speed signals representing the rotational speed at the output of the drive motor 1.

For the input of a rotational speed threshold of the rotational speed at the output of the drive motor 1, an input unit 10 is provided, from which an input line 11 leads to the control unit 6.

In accordance with the evaluation of the signals received by way of the signal lines 5 and 7 and via the input line 11, the control unit 6 actuates the powershift transmission 2, via the first control line 8, to shift a powershift gear or the synchronized transmission 4, via the second control line 9, to shift a synchronized gear.

Figure 2:
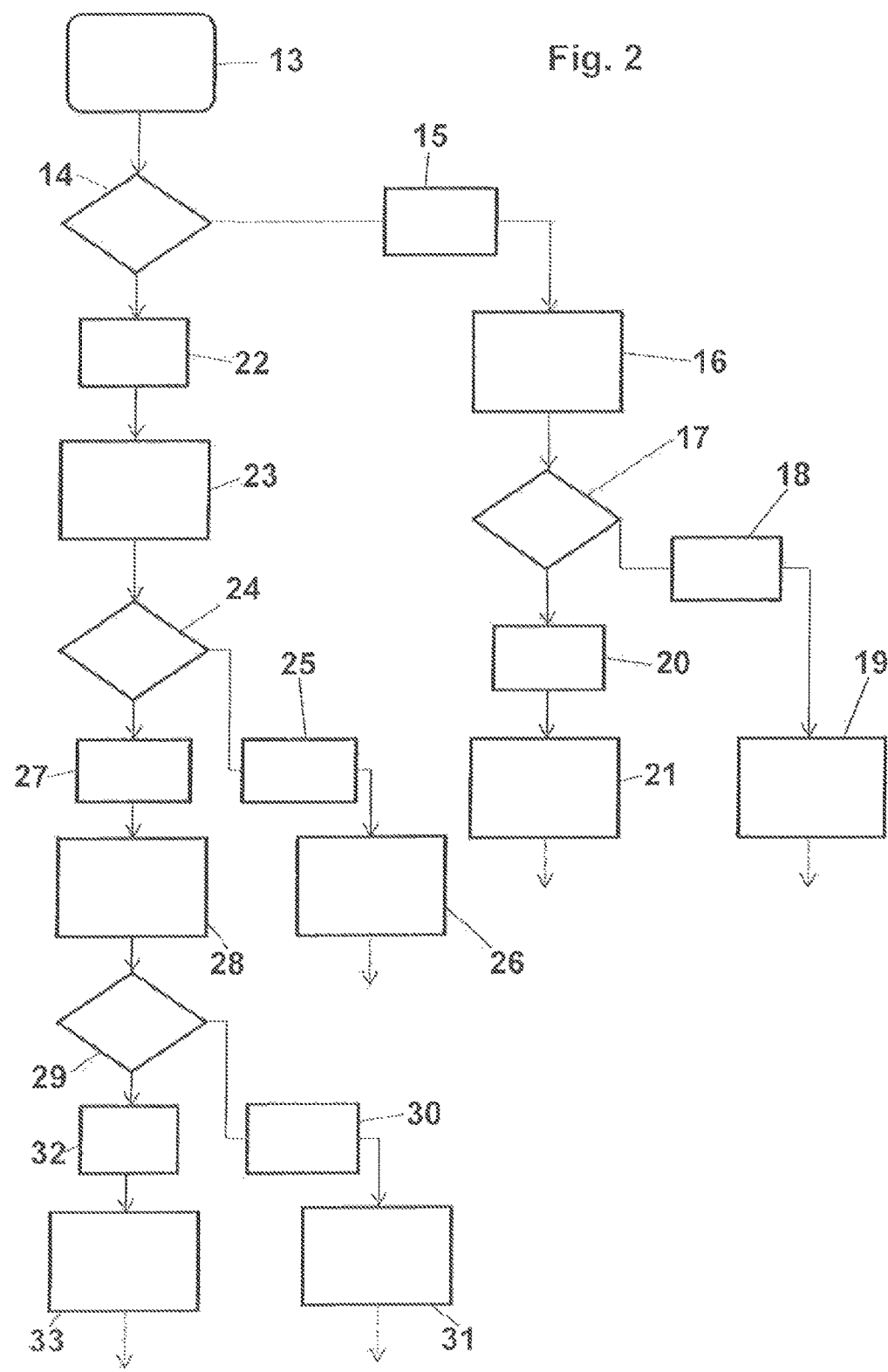
FIG. 2: A flow chart of a method for operating an automated transmission control according to FIG. 1 for a powershift transmission having a plurality of powershift gears and a synchronized transmission having a plurality of synchronized gears, in the drive-train of a vehicle.

The flow chart represented in FIG. 2 shows the method for operating the automated transmission control according to FIG. 1, when by virtue of the motor load a gear of the synchronized transmission 4 or a gear of the powershift transmission 2 has to be engaged, respectively.

In a first step 13, the vehicle is started in the synchronized gear "A" and the powershift gear "1".

In the second step 14, it is decided whether the conditions for an automated shift of the synchronized transmission 4 are fulfilled.

If at the output 15 it is found that such is not the case, then in the third step 16 the powershift transmission 2 is shifted from powershift gear "1" to powershift gear "2", whereas the synchronized gear "A" is left unchanged.

In the fourth step 17, a decision is again made whether the conditions for an automated shift of the synchronized transmission 4 are fulfilled.

If at the output 18 it is found that such is not the case, then in the fifth step 19 the powershift transmission 2 is shifted from powershift gear "2" to powershift gear "3", whereas the synchronized gear "A" is left unchanged.

Subsequently, when by virtue of the motor load a gear of the synchronized transmission 4 or a gear of the powershift transmission 2 is to be changed, a decision process as above takes place.

If by virtue of the motor load, no gear of the synchronized transmission 4 and no gear of the powershift transmission 2 have to be changed, then the powershift transmission 2 and the synchronized transmission 4 are left in their initial gears.

If at the output 20 of the fourth step 17, it is found that the conditions for an automated shift in the synchronized transmission 4 are fulfilled, then in the sixth step 21 a shift takes place in the synchronized transmission 4 into the synchronized gear "B" and in the powershift transmission 2 into the powershift gear "1".

If by virtue of the motor load no gear of the synchronized transmission 4 and no gear of the powershift transmission 2 have to be changed, then after step 21 the powershift transmission 2 and the synchronized transmission 4 are left in their current gears.

If at the output of the second step 14 it is found that the conditions for an automated shift of the synchronized transmission 4 are fulfilled, then in the seventh step 23 a shift takes place in the synchronized transmission 4 into the synchronized gear "B" and in the powershift transmission 2 into the powershift gear "1".

In the eighth step 24 it is again decided whether the conditions for an automated shift of the synchronized transmission 4 are fulfilled.

If at the output 25, it is found that such is not the case, then in step 26 the powershift transmission 2 is shifted from powershift gear "1" to powershift gear "2", whereas the synchronized gear "B" is left unchanged.

If by virtue of the motor load no gear of the synchronized transmission 4 and no gear of the powershift transmission 2 have to be changed, then after step 26 the powershift transmission 2 and the synchronized transmission 4 are left in their current gears.

If at the output 27 of the eighth step 24 it is found that the conditions for an automated shift in the synchronized transmission 4 are fulfilled, then in the tenth step 28 the synchronized transmission 4 is shifted into the synchronized gear "C" and the powershift transmission 2 is shifted to the powershift gear "1".

In the eleventh step 29 it is again decided whether the conditions for an automated shift in the synchronized transmission 4 are fulfilled.

If at the output 30 it is found that such is not the case, then in the twelfth step 31 the powershift transmission 2 is shifted from powershift gear "1" into powershift gear "2", whereas the synchronized gear "C" is left unchanged.

If by virtue of the motor load no gear of the synchronized transmission 4 and no gear of the powershift transmission 2 have to be changed, then after step 31 the powershift transmission 2 and the synchronized transmission 4 are left in their current gears.

If at the output 32 of the eighth step 24 it is found that the conditions for an automated shift in the synchronized transmission 4 are fulfilled, then in the thirteenth step 33 the synchronized transmission 4 is shifted into the synchronized gear "D" and the powershift transmission 2 into the powershift gear "1".

If by virtue of the motor load no gear of the synchronized transmission 4 and no gear of the powershift transmission 2 have to be changed, then after the thirteenth step 33 the powershift transmission 2 and the synchronized transmission 4 are left in their current gears.

INDEXES

1 Drive motor
2 Powershift transmission
3 Driving clutch
4 Synchronized transmission
5 First signal line
6 Control unit
7 Second signal line
8 First control line
9 Second control line
10 Input unit
11 Input fine
12 Rear axle
13 First step
14 Second step
15 Output
16 Third step
17 Fourth step
18 Output
19 Fifth step
20 Output
21 Sixth step
22 Output
23 Seventh step
24 Eighth step
25 Output
26 Ninth step
27 Output
28 Tenth step
29 Eleventh step
30 Output
31 Twelfth step
32 Output
33 Thirteenth step

The invention claimed is:

1. A method of operating an automated transmission control for a powershift transmission having a plurality of powershift gears and a synchronized transmission having a plurality of synchronized gears in a drive-train of a vehicle, the drive-train including a drive motor, the powershift transmission and the synchronized transmission, with an electronic control unit by which an upshift of the gears of the synchronized transmission and of the gears of the powershift transmission can be carried out and to which a motor load signal, representing a motor load of the drive motor and a rotational speed signal representing a rotational speed at the output of the drive motor, can be sent, the method comprising:

upshifting the synchronized transmission by one or more synchronized gears either:
   if a predetermined rotational speed rise/rotational speed gradient of the rotational speed of the output of the drive motor is exceeded, or
   if a predetermined rotational speed of the output of the drive motor is exceeded and a motor load increases above a predetermined motor load which is lower than a full motor load; and upshifting the powershift transmission by one or more powershift gears if either:
   below the predetermined rotational speed rise/rotational speed gradient of the rotational speed of the output of the drive motor, or
   below the predetermined rotational speed of the output of the drive motor and the motor load below the predetermined motor load, the predeterminable rotational speed threshold of the rotational speed of the output of a drive motor is reached.

2. The method according to claim 1, further comprising defining the predetermined rotational speed at the output of the drive motor as greater than 1900 r/min.

3. The method according to claim 2, further comprising defining the predetermined rotational speed at the output of the drive motor as 2050 r/min.

4. The method according to claim 1, further comprising defining the predetermined motor load as greater than 65% of the full load.

5. The method according to claim 4, further comprising defining the predetermined motor load as 75% of the full load.

6. The method according to claim 1, further comprising defining the predeterminable rotational speed threshold of the rotational speed at the output of the drive motor as greater than 1300 r/min.

7. The method according to claim 6, further comprising defining the predeterminable rotational speed threshold of the rotational speed at the output of the drive motor as between 1400 r/min and 2100 r/min.

8. The method according to claim 6, further comprising manually inputting the predeterminable rotational speed threshold into the control unit.

9. A method of automated transmission control of a drive-train of a vehicle with an electronic control unit, the drive train including a drive motor, a powershift transmission, which has a plurality of powershift gears, and a synchronized transmission which has a plurality of synchronized gears, the method comprising:

transmitting a motor load signal, via a signal line, to the electronic control unit, and the motor load signal representing a motor load of the drive motor;

transmitting a rotational speed signal, via another signal line, to the electronic control unit, and the rotational speed signal representing a drive motor output rotational speed;

initiating, with the electronic control unit, an upshift in the synchronized transmission by one or more synchronized gears when either:
   one of a rise of the drive motor output rotational speed exceeds a predetermined output rotational speed rise, and a gradient of the drive motor output rotational speed exceeds a predetermined output rotational speed gradient, or
   the drive motor output rotational speed exceeds a predetermined output rotational speed, and the motor load of the drive motor exceeds a predetermined motor load, and the predetermined motor load being lower than a full motor load; and initiating, with the electronic control unit, an upshift in the powershift transmission by one or more powershift gears when either:
   one of the rise of the drive motor output rotational speed is less than the predetermined output rotational speed rise, and the gradient of the drive motor output rotational speed is less than the predetermined output rotational speed gradient; or
   the drive motor output rotational speed is less than the predetermined output rotational speed, the motor load of the drive motor is less than the predetermined motor load, and the drive motor output rotational speed reaches a predetermined output rotational speed threshold.

* * * * *